United States Patent [19]

Davis et al.

[11] Patent Number: 4,906,043
[45] Date of Patent: Mar. 6, 1990

[54] CHILDS' CAR SEAT TRAY

[76] Inventors: Mark E. Davis; G. Victoria F. Davis, both of 8650 SW. 133rd Ave., Beaverton, Oreg. 97005

[21] Appl. No.: 316,029

[22] Filed: Feb. 27, 1989

[51] Int. Cl.⁴ ............................................. A47B 83/02
[52] U.S. Cl. ..................................... 297/153; 248/499
[58] Field of Search ............... 297/150, 149, 154, 153, 297/219, 252; 248/499

[56] References Cited

U.S. PATENT DOCUMENTS

| 1,251,861 | 1/1918 | Caldwell | 248/499 X |
| 2,278,414 | 4/1942 | Carlson | 297/153 |
| 3,018,133 | 1/1962 | Mills | 297/219 X |
| 3,490,080 | 1/1970 | Siegel | 297/153 |
| 3,516,709 | 6/1970 | Nader | 297/153 |
| 4,575,149 | 3/1986 | Forestal et al. | 297/153 X |
| 4,582,359 | 4/1986 | Wise et al. | 297/153 |
| 4,795,209 | 1/1989 | Quinlan, Jr. | 297/153 |

FOREIGN PATENT DOCUMENTS

| 486798 | 11/1953 | Italy | 248/499 |
| 464806 | 4/1937 | United Kingdom | 297/149 |

Primary Examiner—Peter A. Aschenbrenner

[57] ABSTRACT

A tray for a child's car seat, wherein tension coil springs are used to retain the tray in a position spanning the space between the car seat arm rests. Two laterally spaced leg structures depend from the tray to engage upper surfaces of the arm rests in such fashion as to prevent lateral dislocation of the tray from its installed position. The tray may be quickly removed from the car seat without special tools.

2 Claims, 1 Drawing Sheet

U.S. Patent   Mar. 6, 1990   4,906,043
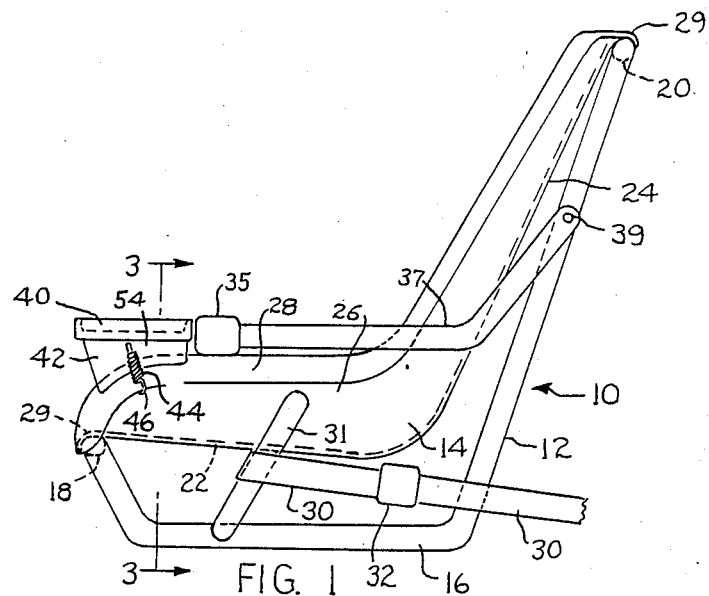
FIG. 1
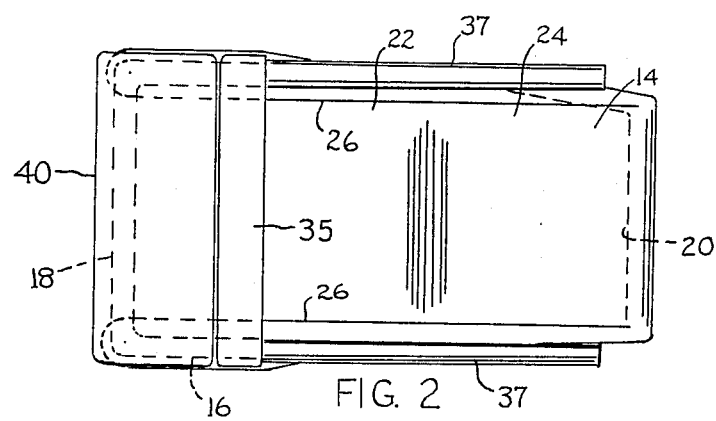
FIG. 2
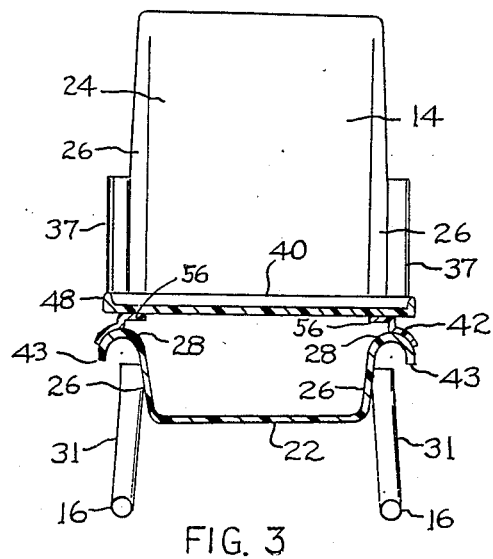
FIG. 3
FIG. 4

CHILDS' CAR SEAT TRAY

BACKGROUND AND SUMMARY OF THE INVENTION

It is known that infant children riding in automotive vehicles are in less danger of being seriously hurt in accidents if they are seated in protective car seats. U.S. Pat. No. 4,456,302 to R. Knoedler et al shows one form that such a car seat can take. Another child's care seat construction is shown in U.S. Pat. No. 4,765,685 to K. Sudoh. U.S. Pat. No. 4,729,600 shows still another car seat construction.

Most child's car seat constructions are designed to restrain and partially surround the child so that in the event of an accident the child will remain within the car seat rather than being thrown out against interior surfaces of the automotive vehicle. Car seat constructions are such that on long trips the child may become restless, due to prolonged inactivity. The child restraints associated with the car seat tend to increase the sense of restlessness that builds up in the child's mind.

The present invention relates to an add-on tray that is attachable to a child's car seat in front of the child. The tray provides a support surface for toys, or a coloring book, or any item that the parent considers useful to make the trip more enjoyable (less stressful) for the child. The tray can also serve as a table to support small jars of baby food while the parent is feeding the child.

An object of the invention is to provide an add-on tray that can be installed quickly on a car seat without special tools.

An additional object is to provide an add-on tray that does not pose a threat of injury to the child in event of an automobile accident.

The tray of this invention is somewhat similar to the tray show in U.S. Pat. No. 3,512,825 to R. Paris, except that the tray of this invention is mounted in place by means of tension springs that hook onto the arm rests of the car seat. The tray shown in U.S. Pat. No. 3,512,829 includes two elongated arms 20 and 21 that are apparently bolted to the child's car seat to hold the tray in place. Special tools would be required to install or remove the tray of U.S. Pat. No. 3,512,829.

THE DRAWINGS

FIG. 1 is a side elevational view of a child's car seat, with a tray of the present invention installed thereon.

FIG. 2 is a top plan view of the FIG. 1 mechanism.

FIG. 3 is a sectional view of the FIG. 1 mechanism, taken on line 3—3.

FIG. 4 is an enlarged fragmentary sectional view of a tray used in the FIG. 1 mechanism.

DESCRIPTION OF A PREFERRED EMBODIMENT OF THE INVENTION

The drawings show principal features of a conventional child's car seat 10 comprising a tubular metal frame 12 and bucket-shaped rigid molded plastic seat section 14. The metal frame includes laterally spaced side sections 16, a front crosspiece 18, and a rear crosspiece, 20.

The molded seat section 14 includes an essentially horizontal seat surface 22, an upstanding seat back surface 24, and side walls 26. Curled lips 29 are formed at the front and rear ends of seat section 14 for attaching the seat section to metal frame 12. Edge areas of the seat side walls are curled outwardly and downwardly, as at 28 (FIG. 3), to form arm rests.

The car seat is attached to an automotive vehicle seat (not shown) by means of a conventional seat belt 30 having a buckle structure 32. Belt 30 is looped around two upstanding tubular frame elements 31 that form component parts of frame 12.

A padded child restraint bar 35 is carried on two laterally spaced tubular arms 37, whose rear ends are pivotably attached to metal frame 12, as at 39. The padded restraint bar can be swung upwardly around pivots 39 to facilitate the child moving into or out of the car seat. Safety straps, not shown, can be provided to hold padded bar 35 in the FIG. 1 position.

The illustrated car seat is of generally conventional design. My invention relates more particularly to an add-on tray 40 usable with the car seat. The tray is installable at the front end of seat section 14 to span the space between arm rests 28. Two laterally spaced leg structures 42 depend from the tray to engage upper surface areas of the arm rests. As seen best in FIG. 3, the lower end surfaces of the leg structures are curved to engage outboard surface areas of the arm rests, such that the two leg structures are prevented from lateral dislocation off of their positions of engagement with the arm rests.

The tray is held down against arm rests 28 by means of two tension coil springs 44 located alongside outboard surfaces of leg structures 42. Each tension spring 44 has its upper end permanently anchored to the associated leg structure 42. The lower end of each coil spring 44 is configured as a hook structure 46. Each hook structure is adapted to be hooked onto the free undersurface edge 43 of arm rest 28, to thereby prevent tray 40 from dislocation movement away from the arm rests.

The lengths of tension springs 44 are selected so that when hook structures 46 are operatively engaged with undersurfaces 43 of the arm rests the associated tray is firmly held in a fixed position spanning the space above the arm rests.

Tray 40 is preferably formed with curved (non-sharp) edges; exterior corner surfaces of the tray are rounded. Also, the tray is provided with an upstanding peripheral rim 48 to help keep items from falling off of the tray surface. For safety reasons the tray surface may be padded. As shown in FIG. 4, the tray may include a flat rigid plastic panel 50 and a plastic foam covering 52. The foam covering can be molded onto the upper surface of panel 50 to form a cushioned upper tray surface; rim 48 is shown as an integral part of the foam covering. Preferably the cushioned foam layer 52 has a smooth non-porous outer skin to facilitate cleaning of the tray. Panel 40 gives the tray the necessary strength.

Each leg structure 42 comprises a vertical wall 54 that extends along the undersurface of tray 40 in a front-to-rear direction (FIG. 1). At its upper end each vertical wall 54 has a laterally-extending flange 56. Rivets, or other type fasteners, are extended through each flange 56 and panel 50 to affix the leg structure to tray 40.

The lower section of each leg structure 42 is in the form of a laterally extending curved foot 58, whose undersurface conforms to the contour on the engaged surface of arm rest 28. A soft resilient elastomeric pad 60 may be adhered to the undersurface of curved foot 58 to provide pressurized contact with the arm rest surface. When coil springs 44 are operatively engaged with arm rest undersurfaces 43 pads 60 are slightly compressed so as to have enhanced frictional contact with the adjacent arm rest surfaces.

The coil springs 44 exert downward pull forces on tray 40 such that leg structures 42 have a clamp action on arm rests 28. The curved undersurfaces of leg structures 42 are engaged with outboard surface areas of arm rests 28, whereby the leg structures exert inward squeeze forces on the two arm rests, to thereby prevent lateral dislocation of the tray. Springs 44 act as resilient hold-down devices for the tray.

Leg structures 42 are designed to fit specific arm rest contours. Thus different child car seat constructions will require different leg structure 42 configurations. The leg structures are formed separately from tray 40 such that the same tray configuration can be used interchangeably with different leg structure 42 configurations.

The drawings show one specific form that the invention can take. Other forms are possible.

We claim:

1. In combination with a child's car seat that comprises a seat section and two laterally-spaced arm rests outboard on either side of said seat section; each arm rest having a transversely curved upper surface that extends downwardly to form a downwardly facing outboard edge (43):

the improvement comprising an add-on tray adapted to span the space between the two arm rests at the front end of the seat section, two laterally spaced leg structures depending from the tray for engagement on upper surfaces of the arm rests, and a tension spring means connected to each leg structure, each tension spring means having an upper end thereof anchored to the associated leg structure and a lower end thereof configured as a hook structure for engagement with a downwardly facing outboard edge of the adjacent arm rest;

the length of the tension spring means being such that when the leg structures and hook structures are operatively engaged with the arm rests the spring means are stressed so as to hook the tray in a fixed position spanning the two arm rests;

each leg structure having a curved undersurface adapted to engage an outboard surface area of the associated arm rest, such that the two leg structures exert an inward clamp force on the arm rests for preventing lateral dislocation of the tray; the outboard edge of each leg structure being located above the outboard edge of the associated arm rest to permit the associated hook structure to operatively engage the arm rest outboard edge.

2. The improvement of claim 1, and further comprising a resilient elastomeric sheet extending along the curved undersurface of each leg structure for frictional pressure engagement on the associated arm rest.

* * * * *